US012298936B2

(12) United States Patent
Margalith et al.

(10) Patent No.: US 12,298,936 B2
(45) Date of Patent: May 13, 2025

(54) USING TIMED OPLOCKS TO DETERMINE WHETHER A FILE IS ELIGIBLE FOR DEHYDRATION

(71) Applicant: Microsoft Technology Licensing, LLC, Redmond, WA (US)

(72) Inventors: Mattan Margalith, Bothell, WA (US); Jack Allen Nichols, Bothell, WA (US); Andrew Keith LaChance, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 26 days.

(21) Appl. No.: 18/185,228

(22) Filed: Mar. 16, 2023

(65) Prior Publication Data

US 2024/0311341 A1 Sep. 19, 2024

(51) Int. Cl.
*G06F 16/17* (2019.01)
*G06F 16/11* (2019.01)

(52) U.S. Cl.
CPC ........ *G06F 16/1727* (2019.01); *G06F 16/122* (2019.01)

(58) Field of Classification Search
CPC .......................... G06F 16/1727; G06F 16/122
See application file for complete search history.

(56) References Cited

U.S. PATENT DOCUMENTS

| 7,475,199 B1* | 1/2009 | Bobbitt | G06F 16/188 |
| | | | 707/999.204 |
| 8,285,681 B2* | 10/2012 | Prahlad | G06F 16/1844 |
| | | | 707/640 |
| 8,380,681 B2* | 2/2013 | Oltean | G06F 16/11 |
| | | | 707/706 |
| 9,117,189 B2* | 8/2015 | Pottlapelli | G06F 16/1774 |
| 9,183,200 B1* | 11/2015 | Liu | G06F 16/20 |
| 9,298,724 B1* | 3/2016 | Patil | G06F 16/1748 |
| 9,792,294 B2* | 10/2017 | Lin | G06F 16/1774 |
| 11,550,666 B1* | 1/2023 | Gunda | G06F 11/1453 |
| 2002/0188605 A1* | 12/2002 | Adya | G06F 16/957 |
| 2009/0327360 A1* | 12/2009 | Rajaram | G06F 12/0891 |
| 2010/0114848 A1* | 5/2010 | McKelvie | G06F 9/526 |
| | | | 707/704 |
| 2010/0333116 A1* | 12/2010 | Prahlad | G06F 3/067 |
| | | | 713/153 |
| 2012/0072400 A1* | 3/2012 | Allred | G06F 16/1774 |
| | | | 707/704 |

(Continued)

OTHER PUBLICATIONS

International Search Report and Written Opinion received for PCT Application No. PCT/US2024/018984, Aug. 1, 2024, 12 pages.

*Primary Examiner* — Debbie M Le
*Assistant Examiner* — Huen Wong
(74) *Attorney, Agent, or Firm* — Han Gim; Newport IP, LLC

(57) ABSTRACT

A data processing system includes a processor; and a memory comprising programming instructions for execution by the processor to manage data files stored using both local and cloud data storage. The instructions, when executed by the processor, cause the processor to obtain a handle with an oplock on a selected file; set a timer; and dehydrate the selected file when the timer elapses provided that the oplock remains unbroken when the file is dehydrated.

20 Claims, 6 Drawing Sheets

(56) References Cited

U.S. PATENT DOCUMENTS

| | | | |
|---|---|---|---|
| 2014/0324945 A1* | 10/2014 | Novak | G06F 3/0604 |
| | | | 709/203 |
| 2014/0330874 A1* | 11/2014 | Novak | G06F 16/176 |
| | | | 707/827 |
| 2015/0229735 A1* | 8/2015 | Rajaram | G06F 16/951 |
| | | | 709/214 |
| 2016/0004718 A1 | 1/2016 | Lin | |
| 2016/0259590 A1* | 9/2016 | Yoshida | G06F 3/0641 |
| 2017/0315875 A1* | 11/2017 | Tirupati Nagaraj | ........ |
| | | | G06F 11/1451 |
| 2018/0025021 A1* | 1/2018 | Jain | G06F 16/183 |
| | | | 707/626 |
| 2018/0060350 A1* | 3/2018 | Christiansen | G06F 16/188 |
| 2018/0084045 A1* | 3/2018 | Nichols | G06F 16/13 |
| 2018/0121101 A1* | 5/2018 | Thind | G06F 3/0655 |
| 2019/0370378 A1* | 12/2019 | Nichols | G06F 16/273 |
| 2020/0304481 A1* | 9/2020 | Rathore | H04L 63/105 |
| 2021/0120004 A1* | 4/2021 | Zhao | H04L 63/20 |
| 2022/0083514 A1* | 3/2022 | Rath | G06F 11/1451 |
| 2022/0239741 A1* | 7/2022 | Nichols | G06F 16/13 |
| 2023/0385236 A1* | 11/2023 | Jones | G06F 16/14 |

\* cited by examiner

USING TIMED OPLOCKS TO DETERMINE WHETHER A FILE IS ELIGIBLE FOR DEHYDRATION

BACKGROUND

Cloud-based data storage can provide a user with a much larger data store than is typically available locally on a user's personal computer or workstation. For example, the size of a personal computer's local storage, such as a hard drive or solid-state drive, may be limited so as to economize on the size or the cost of the personal computer. With such a machine, the user may still have access to a much larger data store that is kept in the cloud and accessible when the computer has a network connection. Thus, with the increase in the amount of electronic content created by users, the bulk of a user's data may be stored in cloud storage to free up space in the local data store. Additionally, cloud storage provides a needed backup of important data.

In such arrangements, systems and methods are needed to manage what electronic content or files are stored locally and which are stored in cloud storage. A file could be stored in both locations or may reside in only one of the two locations. In either case, the user will need to be able to find and access the content that the user desires via his or her local device. An optimal strategy for how and where a particular file is stored can depend on a number of factors including how frequently the user accesses that file.

Hence, there is a need for improved systems and methods of managing the location of file content as between local and cloud storage.

SUMMARY

In one general aspect, the instant disclosure presents a data processing system that includes: a processor; and a memory comprising programming instructions for execution by the processor to manage data files stored using both local and cloud data storage. The instructions, when executed by the processor, cause the processor to obtain a handle with an oplock on a selected file; set a timer; and dehydrate the selected file when the timer elapses provided that the oplock remains unbroken when the file is dehydrated.

In another aspect, the instant disclosure presents a non-transitory computer-readable storage medium that stores programming instructions for execution by a processor to implement an automated file dehydrator to manage data files stored using both local and cloud data storage. The instructions, when executed by the processor, cause the processor to: obtain a handle with an oplock on a selected file; set an oplock listener to notify if the oplock is broken; set a timer; and dehydrate the selected file when the timer elapses provided that the oplock remains unbroken when the file is dehydrated.

In still another aspect, the instant disclosure presents a method for implementing an automated file dehydrator to manage data files stored using both local and cloud data storage data. The method includes: obtaining a handle with an oplock on a selected file; setting a timer; and dehydrating the selected file when the timer elapses provided that the oplock remains unbroken when the file is dehydrated.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
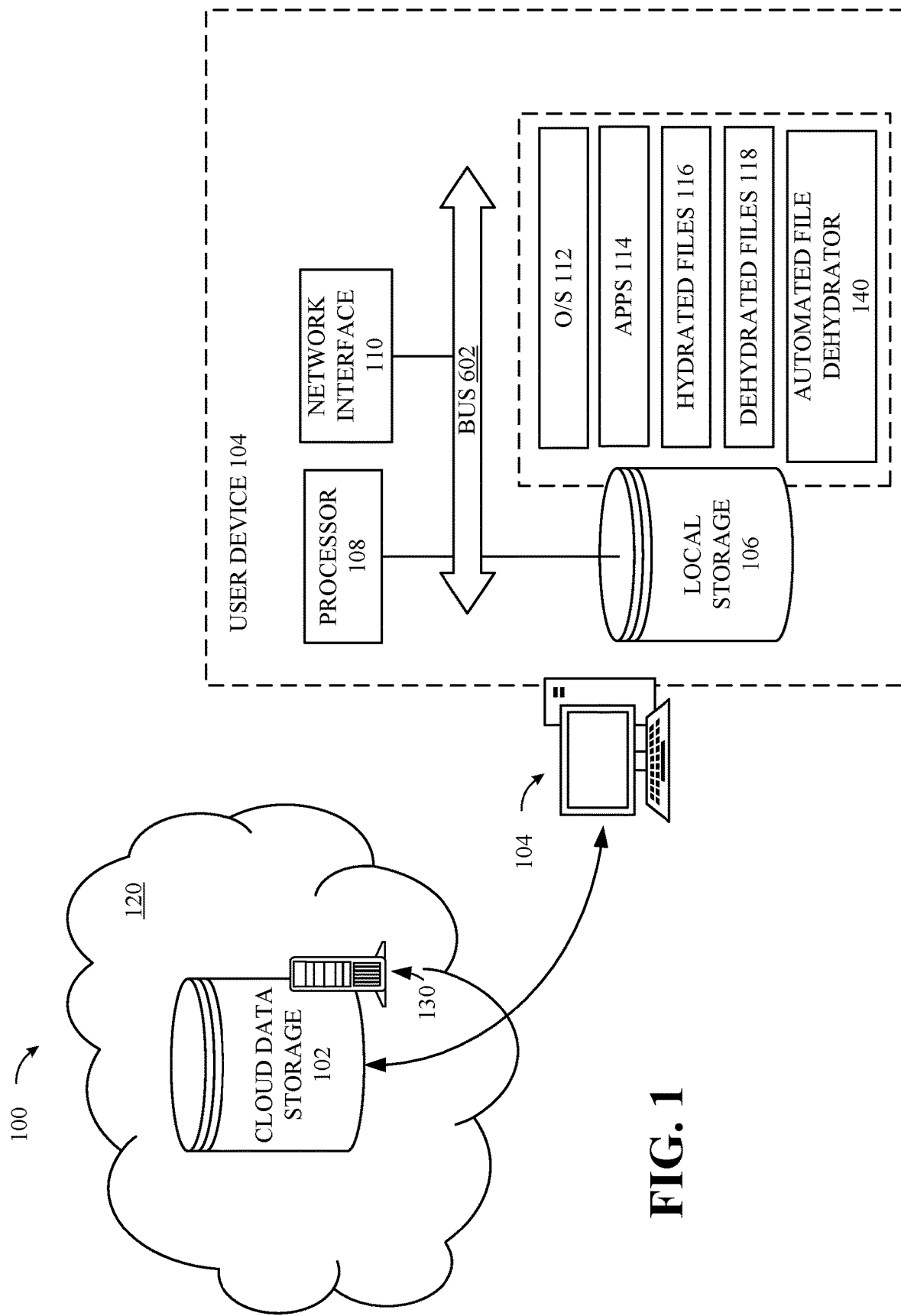
FIG. 1 depicts an example system upon which aspects of this disclosure may be implemented.

As noted above, systems and methods are needed to manage what electronic content or files are stored locally and which are stored in cloud storage. A file could be stored in both locations or may reside in only one of the two locations. In either case, the user will need to be able to find and access the content that the user desires from his or her local device. An optimal strategy for how and where a particular file is stored can depend on a number of factors including, but not limited to, how recently or how frequently the user accesses that file.

As used herein and in the appended claims, the term "cloud storage" will refer to any data storage that is not part of a local personal computer or workstation but that is accessible to the local machine via a network. That network could be a local area network (LAN), a wide area network (WAN), wireless network, the internet or any other data network. Thus, the term "cloud storage" may refer to any data storage device that is external to, but utilized by, a computing device in addition to its own local data storage.

As used herein and in the appended claims, the term "handle," as in the handle of an electronic file, is defined as follows. A handle is a value that acts as a reference to an open file or resource in an operating system. When a file is opened by or in an application program, the operating system assigns a unique handle to the file, which the application program uses to access the contents of the file. Handles can also be opened by the operating system, device drivers, etc. in addition to being opened for application programs). The handle acts as a pointer to the file, allowing the application program to read from or write to the file, as well as perform other operations such as closing the file.

Handles can also be used to access the metadata for the file or modify the metadata or other aspect of the file in some way.

Thus, a handle can be thought of as an identifier for an open file. When a file is closed, the handle is also closed and is no longer valid and cannot be used to access the file. The handle only has meaning while the file is open, and its value is unique within the context of the application program that opened the file or may be unique across the entire computer, depending on the Operating System.

In most operating systems, handles are managed by the operating system and are unseen by the user. The application program requests the handle from the operating system when opening the file, and the operating system returns the handle, which the program can then use to access the file. The application program is responsible for closing the handle when it is finished with the file, which releases the resources associated with the file and allows other applications or programs to access the file. Some handles can be opened in non-exclusive modes, allowing for sharing read, write, and similar.

As used herein and in the appended claims, the terms "hydrated" and "dehydrated" as applied to an electronic file will be defined as follows. In supported operating systems, a file can have two disk states—fully hydrated and dehydrated (placeholder). A hydrated file means that the full file and all of its contents are present on disk. Thus, with reference to a local data store, a hydrated file is fully present with all of its content in the local data store whether or not also being fully copied and present in cloud storage. In contrast, a dehydrated file is represented in the local data store only in the form of a placeholder. This placeholder may be only the metadata of the file without the file content. Thus, for a dehydrated file, the full contents are not stored in the local data store, but rather are fetched from cloud storage when the operating system or an application requests access to the file and its contents.

The hydration process is typically performed in response to a user request for the file and its contents, for example, opening the file with an application. Once hydration has been performed and the contents of the file are downloaded to the local data store, the file will remain fully hydrated until the user or a file management system instructs the system that the file be dehydrated in order to clear disk space in the local data store.

It would be advantageous if the cloud-based data management service could, instead, determine when a file should be dehydrated locally so as to provide additional free space in the local data store. However, if the system automatically dehydrates a file that the user or a system component then wants to access, there will be a delay in accessing the file while the local placeholder for the file is re-hydrated from the cloud data storage. There is also a cost associated with moving data over the network. Thus, there is a tradeoff between freeing space in the local data store and having the file data immediately accessible without needing to rehydrate a dehydrated file.

As used herein and in the appended claims, the term "oplock" will be defined as follows. An oplock (short for "opportunistic concurrency lock" or simply "opportunistic lock") is a mechanism originally used in distributed file systems to allow for efficient file sharing among multiple devices while maintaining data consistency. For example, when a client opens a file stored on a server, the client may request an oplock for the file handle. If the server grants the oplock, the client can continue to read or modify the file locally without requiring frequent communication with the server. The oplock also gives the client notice when another client/application seeks to access the file and the ability to retain control of the file to yield to permit access by other clients/applications. More recently, the concept of an oplock has since expanded to a localized scenario in which the operating system of a computer functions as the grantor of oplocks among the different applications running. In this scenario, the applications are clients of the oplock service of the operating system. Thus, the operating system may grant an oplock to an application that is accessing a file. If another application attempts to access the same file locally, the application holding the oplock is notified. The application can then either close the handle to allow the other application to access the file or decline to do so. If the application with the current oplock declines to close the handle, the other application is blocked from accessing the file.

In terms of file handles, the oplock mechanism typically operates on a per-file basis. When an application requests an oplock, the application specifies the file handle it has for the file to be locked. The operating system then grants an oplock for that specific file handle. If another application tries to obtain a handle for the same file, the oplock will break.

As used herein and in the appended claims, the term "fragile oplock" will be defined as follows. A fragile oplock is an oplock with a high, or the highest, level of lock sensitivity. For example, if another application seeks to obtain a handle for a file on which an oplock has been granted, the oplock will be broken.

As used herein and in the appended claims, the term "Files On-Demand" is defined as follows. In a user interface for a file management system, all the files and folders may appear listed normally even though not all are actually stored currently on the local device. When the user tries to open a file or folder that's not yet downloaded, that file or folder is downloaded from the cloud storage and opened on the local device. After the user finishes using the file, the file may be automatically returned to the cloud to free up space on the local device. However, the name of the file may still appear in the file management interface in the same manner as files that are stored locally. If needed, the user can choose to keep certain files and folders always available offline, i.e., stored locally so that they are accessible even when the local device is not connected to the internet.

As used herein and in the appended claims, the terms "break" or "broken" and related terms with regard to an oplock will be defined as follows. The oplock is typically broken when another application or process attempts to access the same file that is currently being held by a first application with an oplock. When an oplock is broken, the application with the oplock is notified and can yield access to the file to the requesting second application or can decline access.

Again, it would be advantageous if a cloud-based data management service could reliably determine when a file should be dehydrated locally so as to provide additional free space in the local data store. However, the system should not automatically dehydrate a file that will be needed in the near future and causing the user to experience an unwanted delay or cost in accessing the file while the local placeholder for the file is re-hydrated from the cloud data storage.

A file cannot be dehydrated if a handle to it exists. A handle owned by any process means that the file is open or "in use" and thus cannot be dehydrated. Consequently, one approach to automated file dehydration would be a loop to forcibly attempt to acquire an exclusive handle and dehydrate the file. If the loop fails to acquire the handle, this means another application is using the file. Thus, dehydration cannot be completed, and the loop would have to be tried again.

A slightly better approach would be to use an oplock with a handle that functions as an exclusive handle. Thus, if another process attempts to open the file, a notification is sent via the file system to the process that is currently holding the oplock. The process can then close the handle and break the oplock. Thus, with an oplock, the loop can fail to acquire the handle and can also fail any of the subsequent dehydration operations if the handle is broken between the time it is acquired and the file is dehydrated.

These approaches may be too aggressive in automatically dehydrating files. Applications can behave in unexpected ways under normal use, such as by relinquishing and reacquiring a handle to the same file. During such operations, the file is always "in use" as it appears to the user. However, from the perspective of the file system, the file was no longer in use before the acquisition of the second handle. This may lead to wasted system resources because the system attempts to dehydrate the file repeatedly, i.e., inappropriate dehydration (and rehydration), while the file is actually in consistent use. This prevents other processes from accessing the file (due to the exclusive lock), and ultimately results in failure to appropriately dehydrate the file.

Consequently, the present specification describes a different approach or mechanism to determine when it is appropriate to automatically dehydrate a file and evict the contents of the file from the local data store. This approach is based on whether or not the file is in use, accounting for the different ways in which "in use" may be defined. Specifically, "in use" might mean that the file is currently open or is not currently open but was accessed within a specific time period. Thus, a file that has only relatively recently been closed might still be considered "in use" for purposes of considering dehydration.

In the approach now proposed, a handle with an oplock, e.g., a fragile oplock, is obtained on the file. As described above, such a handle is "broken" (e.g. closed) if any other process attempts to acquire a handle on the file. After a specified time period, the state of the oplock is checked. If the oplock is unbroken, no other process has attempted to interact with the file, and the file can be considered unused. The system then determines that it is appropriate to dehydrate the file. Otherwise, the system determines that another process has used the file within the time period. In this case, the file is not dehydrated, and a new time period may be started in which a fragile oplock on the file is again monitored. As a result, any potential delay resulting from prematurely dehydrating and needing to then re-download the contents of the active file is avoided.

FIG. 1 depicts an example system 100 upon which aspects of this disclosure may be implemented. As shown in FIG. 1, a user device 104 may be a client for cloud data storage, as described above. The user device 104 could be a personal computer, workstation or other computing device with a network interface 110 for communicating data via a network or cloud 120.

As shown in FIG. 1, an example of a user device 104 may include a processor 108 and a local data storage 106. The processor 108 may be or include any number of processors or processing cores working in tandem. The local data storage 106 may be or include a hard drive, solid-state drive, flash memory, Random Access Memory (RAM), a disc array or any other form of electronic data storage. The processor 108 and local storage 106 are connected via a data bus 602.

The local storage 106 will contain different types of programming instructions, applications, programs, software, firmware and data files. As shown in FIG. 1, the local storage 106 will store an operating system (O/S) 112 for execution by the processor 108. Although not specifically illustrated, this will include a Basic Input Output System (BIOS), drivers and firmware needed to operate the user device 104.

A number of applications or programs 114 are also contained in the local storage 106. Applications 114 are executed on the O/S after the O/S is executing. The applications 114 are used to open and use electronic data files that may also be stored in the local storage 106. As described above, the O/S may grant oplocks to any of the applications 114 or other services that are accessing a file.

As also described above, the burden of storing electronic data may be shared between the local storage 106 and cloud data storage 102 that is accessible to the user device 104. Consequently, the bus 602 also provides communication for the processor 108 with the network interface 110. Through this network interface 110, the user device 104 can communicate with other devices via the network or cloud 120. Specifically, the user device 104 may access a server 130 that provides cloud data storage 102. The user device 104 can backup important files to the cloud data storage 102. Also, as described above, the user device 104 may free up space in the local storage 106 by offloading electronic data to the cloud data storage 102. Consequently, as shown in FIG. 1, the local storage 106 can contain both hydrated files 116 and dehydrated files 118.

As will be described in greater detail below, the automated file dehydrator 140 can appropriately and automatically dehydrate files on the local storage 106 to provide additional memory space in the local storage 106. As shown in FIG. 1, the automated file dehydrator 140 is resident on user device 104. However, in other examples, the automated file dehydrator may be executing on the server 130 in the cloud 120. In still another example, the automated file dehydrator may be executing on the cloud server while having an agent application executing on the user device.

Figure 2:
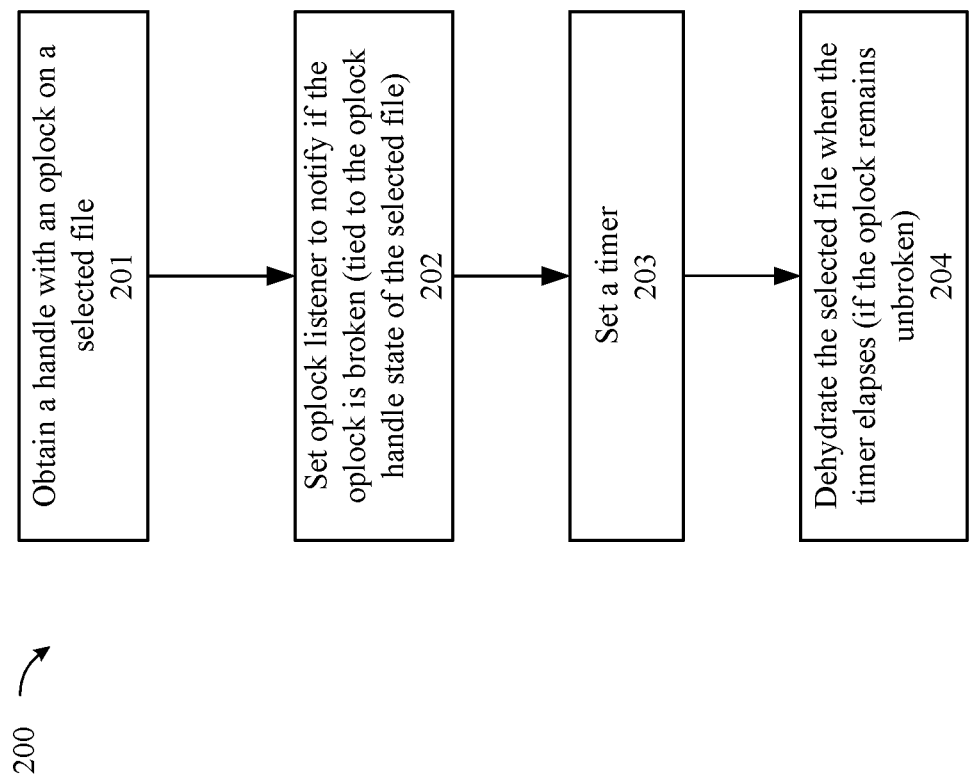
FIG. 2 depicts a flow diagram of an illustrative method of automatically managing file dehydration upon which aspects of this disclosure may be implemented.

FIG. 2 depicts a flow diagram of an illustrative method of automatically managing file dehydration upon which aspects of this disclosure may be implemented. As shown in FIG. 2, the method 200 begins with the automated file dehydrator obtaining 201 a handle with an oplock on a selected file that is a candidate for dehydration. The automated file dehydrator may be conducting the method of FIG. 2 simultaneously on any number of candidate files to possibly dehydrate. In specific examples, the oplock obtained may be a fragile oplock, as defined above.

Additionally, the automated file dehydrator will set 202 an oplock listener. This oplock listener is a function that will issue a notification in the event that the corresponding oplock is broken. As described above, whether the oplock is broken may be tied to the state of the handle on the file obtained with the oplock.

In conjunction with obtaining the handle and oplock and setting the listener, the automated file dehydrator will also set 203 a timer. The amount of time measured by the timer can be set as an average amount of time, within which, a file will be used or, if the file is not used within that specified time, the file may be dehydrated. An optimal value for this timer may vary depending on the type of data represented by the files on the user device, the habits of the user of the user device, the reliability of the connection with the cloud storage and other similar factors. The automated file dehydrator may include a user interface 302 that allows a user to set or adjust the amount of time counted by the timer of the automated file dehydrator.

As will be described in greater detail below, the automated file dehydrator is, at all times in the process, checking for the listener to indicate that the oplock has been broken. If, at any point in the process, the oplock is broken, this indicates that the usage of the candidate file is ongoing or too frequent or recent for the file to be dehydrated. Thus, the automated file dehydrator will only dehydrate 204 the file in the event that the timer has elapsed and the oplock remains unbroken. The automated file dehydrator may even double check between the expiration of the timer and actual dehydration of the file to see if the oplock has been broken. Again, if at any point in the process the oplock is broken, this indicates that the usage of the candidate file is ongoing or is too frequent or recent for the file to be dehydrated.

Figure 3:
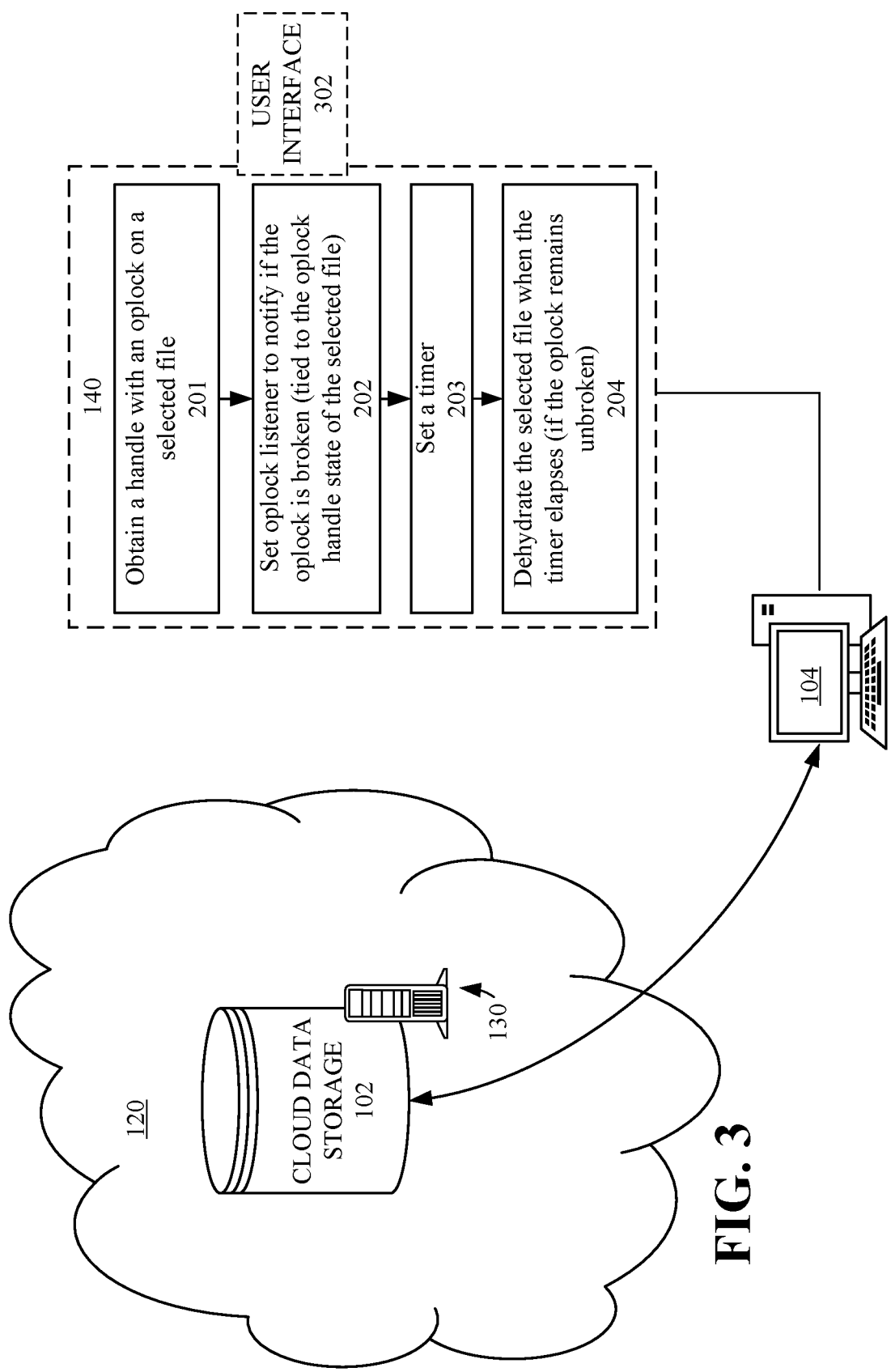
FIG. 3 depicts additional details of an illustrative system similar to that illustrated in FIG. 1.

FIG. 3 depicts additional details of an illustrative system similar to that depicted in FIG. 1. As shown in FIG. 3, the user device 104 supports the automated file dehydrator 140, which can include programming instructions on a non-transitory computer readable medium. These instructions cause a processor of the user device 104 to execute the method of FIG. 2 with the O/S granting the oplock, as needed. In such a case, the user device 104 may include the architecture illustrated in FIG. 6. For example, the static memory 634 may include the programming instructions for steps 201-204. These instructions may be executed by the processor 610 to perform the method illustrated in FIG. 2 or FIG. 4, as described below.

Figure 4:
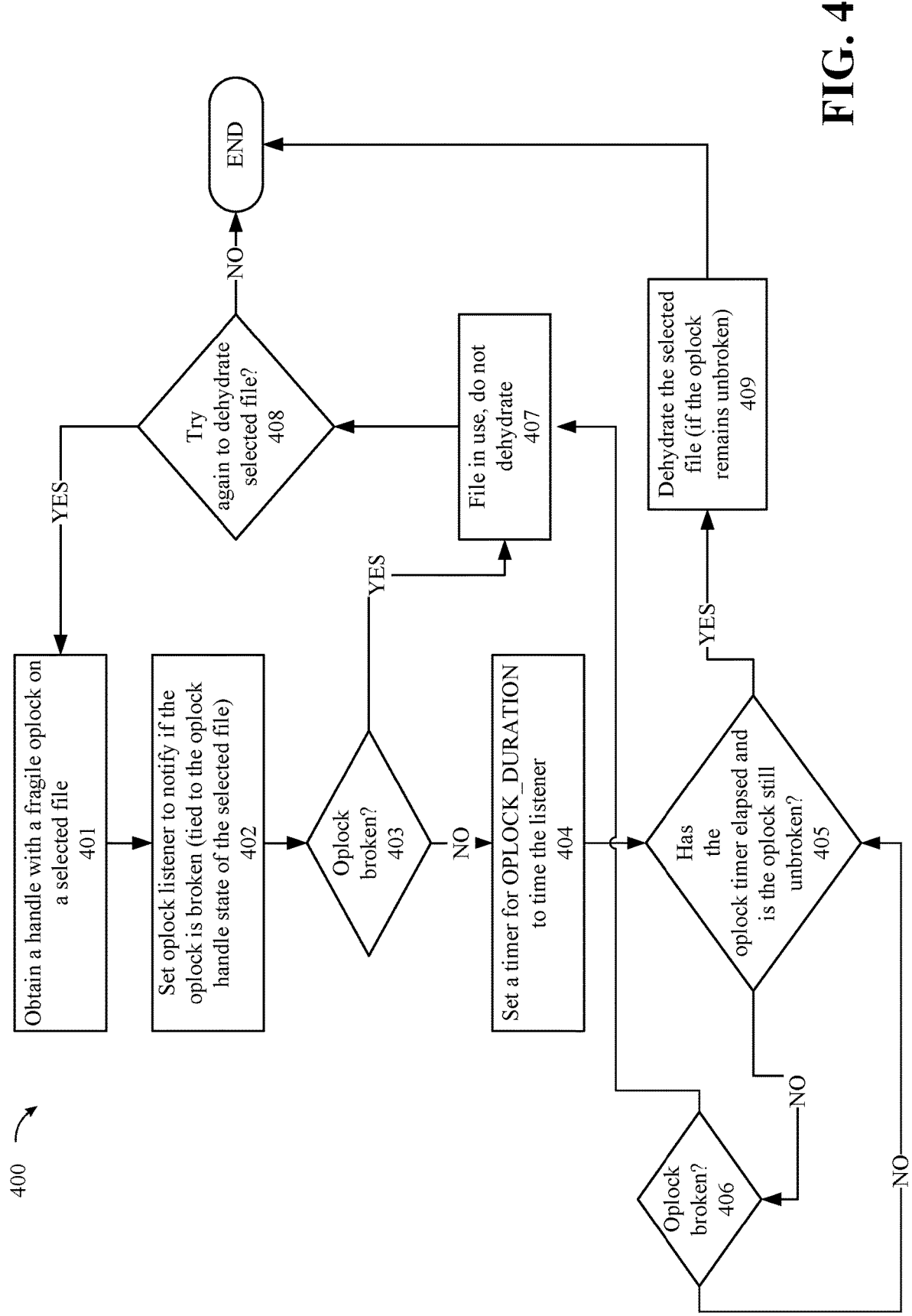
FIG. 4 depicts a more detailed flow diagram of an illustrative method of automatically managing file dehydration upon which aspects of this disclosure may be implemented.

FIG. 4 depicts a more detailed flow diagram of an illustrative method of automatically managing file dehydration upon which aspects of this disclosure may be implemented. The method 400 illustrated in FIG. 4 includes the basic flow of FIG. 2, but illustrates additional details.

As shown in FIG. 4, the method again begins with the automated file dehydrator obtaining 401 a handle with an oplock on a selected file that is a candidate for dehydration. In the specific example of FIG. 4, the oplock is a fragile oplock, as defined above. This means that the oplock has a high, or the highest possible, sensitivity to being broken. In this example, the handle is an exclusive handle that prevents another process from obtaining a handle to the selected candidate file.

The automated file dehydrator also sets 402 a listener to notify if the oplock is broken. The exclusive nature of the handle will prevent the oplock from being broken between the creation of the handle/oplock and the setting of the listener. Thereafter, the automated file dehydrator will begin checking 403 for the oplock to be broken via the listener. As noted above, if, at any point in the process, the oplock is broken, this indicates that the usage of the candidate file is ongoing or too frequent or recent for the file to be dehydrated.

Next, the automated file dehydrator will set 404 a timer for the listener. This timer is for an OPLOCK_DURATION value. As noted above, an optimal value for this timer may vary depending on the type of data represented by the files on the user device, the habits of the user of the user device, the reliability of the connection with the cloud storage and other similar factors. The automated file dehydrator may include a user interface 302 that allows a user to set or adjust the amount of time counted by the timer of the automated file dehydrator.

As the timer is set and thereafter, the automated file dehydrator continues to check 405 the listener for notice that the oplock has been broken. Specifically, the automated file dehydrator determines 405 two conditions: has the oplock been broken and has the timer elapsed. If both conditions are achieved, the automated file dehydrator will proceed to dehydrate 409 the file. Again, at every point prior to actual dehydration, the automated file dehydrator checks for breaking of the oplock via the listener. Consequently, if the timer were to elapse, but the oplock be broken before dehydration of the file can be undertaken, the file is not dehydrated and the method terminates or may iterate again.

As also shown in FIG. 4 during the monitoring 405 for the two conditions specified, the automated file dehydrator continually loops through a check 406 as to whether the oplock has been broken. This done is by checking for the notice from the listener that the oplock has been broken. At any time that the oplock is broken 406, the file is determined 407 to be in use, currently or recently enough, that it is not a candidate for dehydration at that time.

Figure 5:
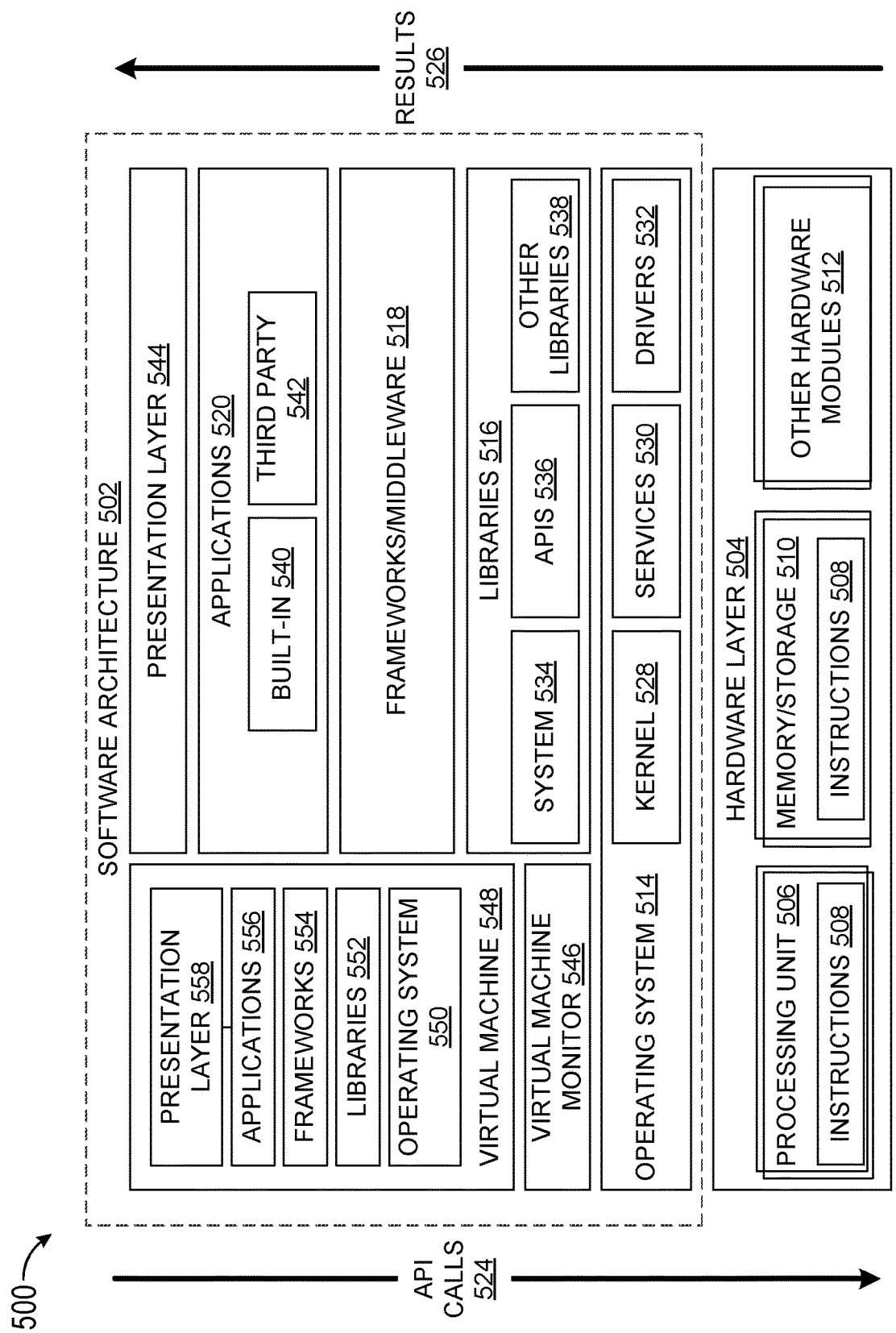
FIG. 5 is a block diagram illustrating an example software architecture, various portions of which may be used in conjunction with various hardware architectures herein described.

FIG. 5 is a block diagram 500 illustrating an example software architecture 502. This software architecture can be part of a system, as described, herein for managing the location of electronic file content as between local and cloud storage, specifically, when files are dehydrated from local storage. Various portions of this illustrated software architecture may be used in conjunction with various hardware architectures herein described, which may implement any of the above-described features. FIG. 5 is a non-limiting example of a software architecture, and it will be appreciated that many other architectures may be implemented to facilitate the functionality described herein. The software architecture 502 may execute on hardware such as client devices, native application provider, web servers, server clusters, external services, and other servers. A representative hardware layer 504 includes a processing unit 506 and associated executable instructions 508. The executable instructions 508 represent executable instructions of the software architecture 502, including implementation of the methods, modules and so forth described herein.

The hardware layer 504 also includes a memory/storage 510, which also includes the executable instructions 508 and accompanying data. The hardware layer 504 may also include other hardware modules 512. Instructions 508 held by processing unit 506 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks 518, applications 520, and a presentation layer 544. Operationally, the applications 520 and/or other components within the layers may invoke API calls 524 to other layers and receive corresponding results 526. The layers illustrated are representative in nature and other software architectures may include additional or different layers. For example, some mobile or special purpose operating systems may not provide the frameworks/middleware 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For instance, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform tasks, rather than rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 516 may also include a wide variety of other libraries 538 to provide many functions for applications 520 and other software modules.

The frameworks 518 (also sometimes referred to as middleware) provide a higher-level common infrastructure that may be used by the applications 520 and/or other software modules. For example, the frameworks 518 may provide various graphic user interface (GUI) functions, high-level resource management, or high-level location services. The frameworks 518 may provide a broad spectrum of other APIs for applications 520 and/or other software modules.

The applications 520 include built-in applications 540 and/or third-party applications 542. Examples of built-in applications 540 may include, but are not limited to, a contacts application, a browser application, a location application, a media application, a messaging application, and/or a game application. Third-party applications 542 may include any applications developed by an entity other than the vendor of the particular system. The applications 520 may use functions available via OS 514, libraries 516, frameworks 518, and presentation layer 544 to create user interfaces to interact with users.

Some software architectures use virtual machines, as illustrated by a virtual machine 548. The virtual machine 548 provides an execution environment where applications/modules can execute as if they were executing on a hardware machine (such as the machine depicted in block diagram 600 of FIG. 6, for example). The virtual machine 548 may be hosted by a host OS (for example, OS 514) or hypervisor, and may have a virtual machine monitor 546 which manages operation of the virtual machine 548 and interoperation with the host operating system. A software architecture, which may be different from software architecture 502 outside of the virtual machine, executes within the virtual machine 548 such as an OS 550, libraries 552, frameworks 554, applications 556, and/or a presentation layer 558.

Figure 6:
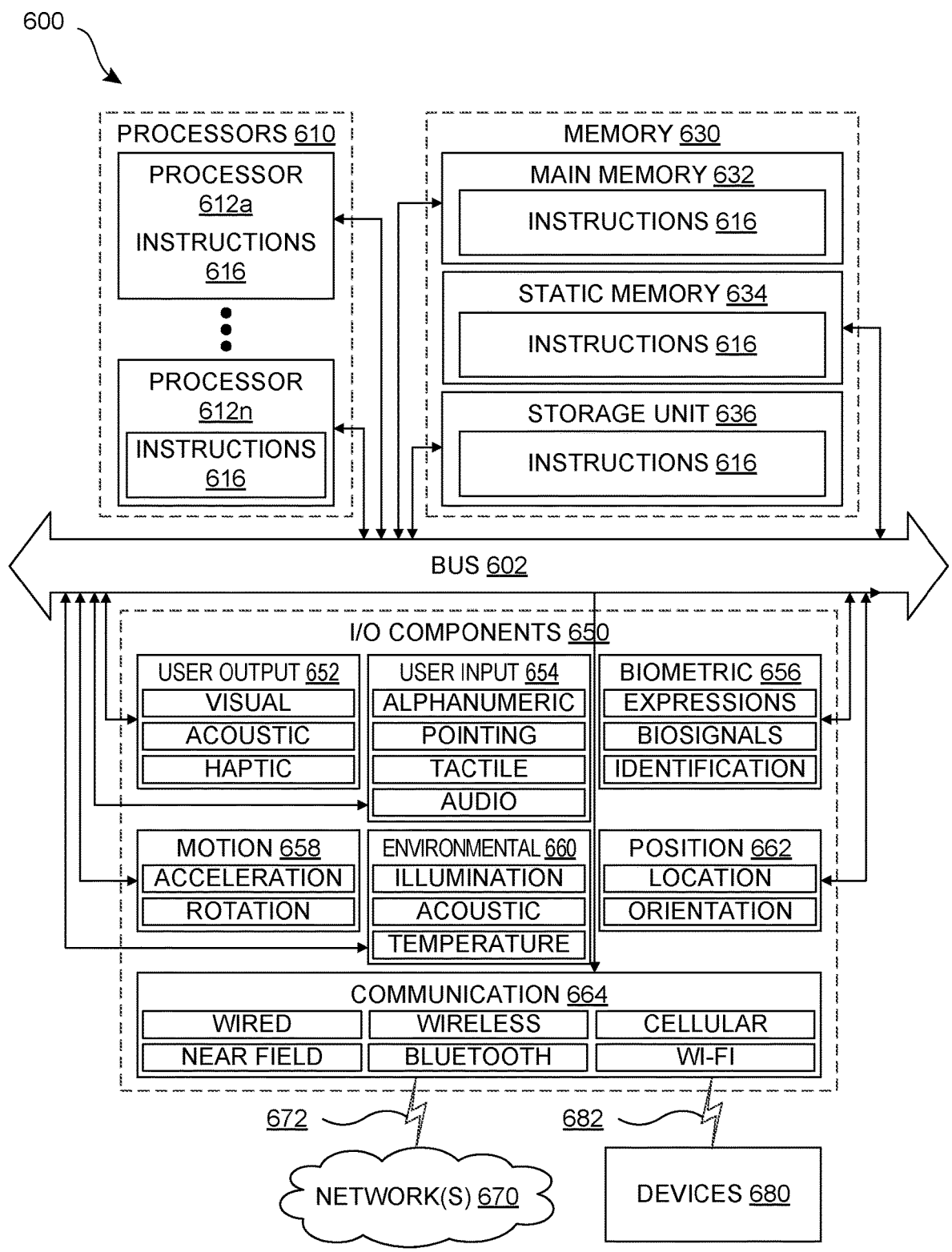
FIG. 6 is a block diagram illustrating components of an example machine configured to read instructions from a machine-readable medium and perform any of the features described herein.

FIG. 6 is a block diagram illustrating components of an example machine 600 configured to read instructions from a machine-readable medium (for example, a machine-readable storage medium) and perform any of the features described herein. This example machine can be part of a system, as described, herein for managing the location of electronic file content as between local and cloud storage, specifically, when files are dehydrated from local storage.

The example machine 600 is in a form of a computer system, within which instructions 616 (for example, in the form of software components) for causing the machine 600 to perform any of the features described herein may be executed. As such, the instructions 616 may be used to implement methods or components described herein. The instructions 616 cause unprogrammed and/or unconfigured machine 600 to operate as a particular machine configured to carry out the described features. The machine 600 may be configured to operate as a standalone device or may be coupled (for example, networked) to other machines. In a networked deployment, the machine 600 may operate in the capacity of a server machine or a client machine in a server-client network environment, or as a node in a peer-to-peer or distributed network environment. Machine 600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 600 is illustrated, the term "machine" includes a collection of machines that individually or jointly execute the instructions 616.

The machine 600 may include processors 610, memory 630, and I/O components 650, which may be communicatively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a digital signal processor (DSP), an ASIC, or a suitable combination thereof) may include one or more processors $612a$ to $612n$ that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple processors, the machine 600 may include a single processor with a single core, a single processor with multiple cores (for example, a multi-core processor), multiple processors each with a single core, multiple processors each with multiple cores, or any combination thereof. In some examples, the machine 600 may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, completely or partially, within the memory 632, 634, within the storage unit 636, within at least one of the processors 610 (for example, within a command buffer or cache memory), within memory at least one of I/O components 650, or any suitable combination thereof, during execution thereof. Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accordingly, a "machine-readable medium" may refer to a single storage device, as well as "cloud-based" storage systems or storage networks that include multiple storage apparatus or devices.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656, motion components 658, environmental components 660 and/or position components 662, among a wide array of other environmental sensor components. The biometric components 656 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 662 may include, for example, location sensors (for example, a Global Position System (GPS) receiver), altitude sensors (for example, an air pressure sensor from which altitude may be derived), and/or orientation sensors (for example, magnetometers). The motion components 658 may include, for example, motion sensors such as acceleration and rotation sensors. The environmental components 660 may include, for example, illumination sensors, acoustic sensors and/or temperature sensors.

The I/O components 650 may include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth communication, Wi-Fi, and/or communication via other modalities. The device(s) 680 may include other machines or various peripheral devices (for example, coupled via USB).

In some examples, the communication components 664 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 664, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-6) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system comprising:
  a processor; and
  a memory comprising programming instructions for execution by the processor to manage data files stored using both local and cloud data storage;
  the instructions, when executed by the processor, causing the processor to obtain a handle with an oplock on a selected file;
  set a timer; and
  dehydrate the selected file when the timer elapses provided that the oplock remains unbroken when the file is dehydrated.

Item 2. The data processing system of Item 1, wherein the oplock is a fragile oplock.

Item 3. The data processing system of Item 1, the instructions further causing the processor to set an oplock listener to notify if the oplock is broken.

Item 4. The data processing system of Item 1, the instructions further causing the processor to check whether the oplock has broken between the timer elapsing and beginning dehydration of the selected file.

Item 5. The data processing system of Item 1, wherein, at any point that the oplock on the selected file is broken, the processor desists from possible dehydration of the selected file.

Item 6. The data processing system of Item 5, the instructions further causing the processor to, in response to the oplock being broken, reiterate obtaining a handle and oplock on the selected file and setting a timer.

Item 7. The data processing system of Item 1, further comprising a user interface to receive user input setting an amount of time to be timed by the timer.

Item 8. The data processing system of Item 1, comprising a cloud server for providing cloud data storage and comprising the processor and memory.

Item 9. The data processing system of Item 1, comprising a user device that comprise the processor and memory.

Item 10. A non-transitory computer-readable storage medium comprising programming instructions for execution by a processor to implement an automated file dehydrator to manage data files stored using both local and cloud data storage;
  the instructions, when executed by the processor, causing the processor to:
    obtain a handle with an oplock on a selected file;
    set an oplock listener to notify if the oplock is broken;
    set a timer; and
    dehydrate the selected file when the timer elapses provided that the oplock remains unbroken when the file is dehydrated.

Item 11. The computer-readable storage medium of Item 10, wherein the oplock is a fragile oplock.

Item 12. The computer-readable storage medium of Item 10, the instructions further causing the processor to check whether the oplock has broken between the timer elapsing and beginning dehydration of the selected file.

Item 13. The computer-readable storage medium of Item 10, wherein, at any point that the oplock on the selected file is broken, the instructions cause the processor to desist from possible dehydration of the selected file.

Item 14. The computer-readable storage medium of Item 13, the instructions further causing the processor to, in response to the oplock being broken, reiterate obtaining a handle and oplock on the selected file and setting the timer.

Item 15. The computer-readable storage medium of Item 13, the instructions further comprising a user interface to receive user input setting an amount of time to be timed by the timer.

Item 16. A method for implementing an automated file dehydrator to manage data files stored using both local and cloud data storage data, the method comprising:
  obtaining a handle with an oplock on a selected file;
  setting a timer; and
  dehydrating the selected file when the timer elapses provided that the oplock remains unbroken when the file is dehydrated.

Item 17. The method of Item 16, wherein the oplock is a fragile oplock.

Item 18. The method of Item 16, further comprising implementing an oplock listener to notify if the oplock is broken.

Item 19. The method of Item 16, further comprising checking whether the oplock has broken between the timer elapsing and beginning dehydration of the selected file.

Item 20. The method of Item 19, wherein, at any point that the oplock on the selected file is broken, the automated file dehydrator desists from possible dehydration of the selected file and reiterates obtaining a handle and oplock on the selected file and setting a timer.

In the foregoing detailed description, numerous specific details were set forth by way of examples in order to provide a thorough understanding of the relevant teachings. It will be apparent to persons of ordinary skill, upon reading the description, that various aspects can be practiced without such details. In other instances, well known methods, procedures, components, and/or circuitry have been described at a relatively high-level, without detail, in order to avoid unnecessarily obscuring aspects of the present teachings.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
   a processor; and
   a memory comprising programming instructions for execution by the processor to implement an automated file dehydrator to manage data files stored in both local and cloud data storage, the instructions, when executed by the processor, causing the processor to:
   select a data file as a candidate for dehydration in which only a placeholder for the data file is stored in the local data storage while remaining data for the data file is moved to the cloud data storage;
   obtain a handle together with an oplock on the selected data file, wherein the handle acts as a pointer to the selected data file, allowing an application program to read from or write to the selected data file;
   set an oplock listener to notify the automated file dehydrator whether the oplock on the selected data file is broken;
   set a timer to count a set time from when the handle with the oplock is obtained;
   determine whether the timer has expired and the oplock remains unbroken;
   if it is determined that the timer has expired and the oplock remains unbroken, dehydrate the selected data file using the automated file dehydrator; and
   if it is determined that the timer has not expired and the oplock is broken, acquire a new handle with the oplock and restart the timer upon obtaining the new handle without dehydrating the selected data file.

2. The data processing system of claim 1, wherein the oplock is a fragile oplock.

3. The data processing system of claim 1, wherein the timer is set to an average amount of time within which a file in local storage is used.

4. The data processing system of claim 1, the instructions further causing the processor to check whether the oplock has broken between the timer expiring and beginning dehydration of the selected data file.

5. The data processing system of claim 1, wherein, at any point that the oplock on the selected data file is broken, the processor desists from possible dehydration of the selected data file.

6. The data processing system of claim 5, the instructions further causing the processor to, in response to the oplock being broken, reiterate obtaining a handle and oplock on the selected data file and setting a timer.

7. The data processing system of claim 1, further comprising a user interface to receive user input setting an amount of time to be timed by the timer.

8. The data processing system of claim 1, comprising a cloud server for providing cloud data storage and comprising the processor and memory.

9. The data processing system of claim 1, comprising a user device that comprise the processor and memory.

10. A non-transitory computer-readable storage medium comprising programming instructions for execution by a processor to implement an automated file dehydrator to manage data files stored in both local and cloud data storage;
   the instructions, when executed by the processor, causing the processor to:
   select a data file as a candidate for dehydration in which only a placeholder for the data file is stored in the local data storage while remaining data for the data file is moved to the cloud data storage;
   obtain a handle together with an oplock on the selected data file, wherein the handle acts as a pointer to the selected data file, allowing an application program to read from or write to the selected data file;
   set an oplock listener to notify the automated file dehydrator whether the oplock on the selected data file is broken;
   set a timer to count a set time from when the handle with the oplock is obtained;
   determine whether the timer has expired and the oplock remains unbroken;
   if it is determined that the timer has expired and the oplock remains unbroken, dehydrate the selected data file using the automated file dehydrator; and
   if it is determined that the timer has not expired and the oplock is broken, acquire a new handle with the oplock and restart the timer upon obtaining the new handle without dehydrating the selected data file.

11. The computer-readable storage medium of claim 10, wherein the oplock is a fragile oplock.

12. The computer-readable storage medium of claim 10, the instructions further causing the processor to check whether the oplock has broken between the timer elapsing and beginning dehydration of the selected data file.

13. The computer-readable storage medium of claim 10, wherein, at any point that the oplock on the selected data file is broken, the instructions cause the processor to desist from possible dehydration of the selected data file.

14. The computer-readable storage medium of claim 13, the instructions further causing the processor to, in response to the oplock being broken, reiterate obtaining a handle and oplock on the selected file and setting the timer.

15. The computer-readable storage medium of claim 13, the instructions further comprising a user interface to receive user input setting an amount of time to be timed by the timer.

16. A method for implementing an automated file dehydrator to manage data files stored using both local and cloud data storage data, the method comprising:
   selecting a data file as a candidate for dehydration in which only a placeholder for the data file is stored in the local data storage while remaining data for the data file is moved to the cloud data storage;
   obtaining a handle together with an oplock on the selected data file, wherein the handle acts as a pointer to the selected data file, allowing an application program to read from or write to the selected data file;
   setting an oplock listener to notify the automated file dehydrator whether the oplock on the selected data file is broken;
   setting a timer to count a set time from when the handle with the oplock is obtained;
   determining whether the timer has expired and the oplock remains unbroken;
   if it is determined that the timer has expired and the oplock remains unbroken, dehydrating the selected data file using the automated file dehydrator; and
   if it is determined that the timer has not expired and the oplock is broken, acquiring a new handle with the oplock and restart the timer upon obtaining the new handle without dehydrating the selected data file.

17. The method of claim 16, wherein the oplock is a fragile oplock.

18. The method of claim 16, further comprising implementing an oplock listener to notify if the oplock is broken.

19. The method of claim 16, further comprising checking whether the oplock has broken between the timer elapsing and beginning dehydration of the selected data file.

20. The method of claim 19, wherein, at any point that the oplock on the selected file is broken, the automated file dehydrator desists from possible dehydration of the selected data file and reiterates obtaining a handle and oplock on the selected data file and setting a timer.

* * * * *